United States Patent
Penzes et al.

(10) Patent No.: US 9,407,272 B2
(45) Date of Patent: Aug. 2, 2016

(54) SYSTEMS AND METHODS FOR DISTRIBUTING AN AGING BURDEN AMONG PROCESSOR CORES

(75) Inventors: Paul Penzes, Irvine, CA (US); Mark Fullerton, Austin, TX (US); Hwisung Jung, Irvine, CA (US); John Walley, Ladera Ranch, CA (US); Tim Sippel, Portland, OR (US); Love Kothari, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 680 days.

(21) Appl. No.: 13/341,748

(22) Filed: Dec. 30, 2011

(65) Prior Publication Data
US 2013/0047166 A1 Feb. 21, 2013

Related U.S. Application Data

(60) Provisional application No. 61/524,538, filed on Aug. 17, 2011.

(51) Int. Cl.

| | | |
|---|---|---|
| G06F 9/46 | (2006.01) | |
| H03L 7/08 | (2006.01) | |
| H03K 3/03 | (2006.01) | |
| H03K 3/037 | (2006.01) | |
| H03K 19/01 | (2006.01) | |
| G06F 12/14 | (2006.01) | |
| G06F 21/44 | (2013.01) | |
| H03K 5/13 | (2014.01) | |
| H03L 7/097 | (2006.01) | |
| H03L 7/099 | (2006.01) | |
| G06F 1/32 | (2006.01) | |
| G06F 1/26 | (2006.01) | |
| H03K 5/00 | (2006.01) | |

(52) U.S. Cl.
CPC .............. *H03L 7/0802* (2013.01); *G06F 1/32* (2013.01); *G06F 12/14* (2013.01); *G06F 21/44* (2013.01); *H03K 3/0315* (2013.01); *H03K 3/0375* (2013.01); *H03K 5/133* (2013.01); *H03K 19/01* (2013.01); *H03L 7/097* (2013.01); *H03L 7/0997* (2013.01); *G06F 1/26* (2013.01); *G06F 1/3203* (2013.01); *G06F 1/3228* (2013.01); *H01L 2924/0002* (2013.01); *H03K 2005/00026* (2013.01); *H03K 2005/00058* (2013.01)

(58) Field of Classification Search
CPC ....................................................... G06F 1/32
See application file for complete search history.

(56) References Cited

U.S. PATENT DOCUMENTS

| | | | |
|---|---|---|---|
| 2005/0050373 A1* | 3/2005 | Orenstien et al. | 713/320 |
| 2007/0143763 A1* | 6/2007 | Adachi et al. | 718/104 |
| 2007/0157035 A1* | 7/2007 | Gumma et al. | 713/300 |
| 2008/0126064 A1* | 5/2008 | Tseng et al. | 703/14 |
| 2008/0155282 A1* | 6/2008 | Gammie et al. | 713/300 |
| 2008/0163255 A1* | 7/2008 | Munoz et al. | 719/318 |
| 2009/0064164 A1* | 3/2009 | Bose et al. | 718/105 |

(Continued)

*Primary Examiner* — Eric C Wai
*Assistant Examiner* — James J Lee
(74) *Attorney, Agent, or Firm* — Sterne, Kessler, Goldstein & Fox PLLC

(57) ABSTRACT

Systems and methods are presented for reducing the impact of high load and aging on processor cores in a processor. A Power Management Unit (PMU) can monitor aging, temperature, and increased load on the processor cores. The PMU instructs the processor to take action such that aging, temperature, and/or increased load are approximately evenly distributed across the processor cores, so that the processor can continue to efficiently process instructions.

20 Claims, 10 Drawing Sheets

(56) References Cited

U.S. PATENT DOCUMENTS

| | | | |
|---|---|---|---|
| 2009/0083551 A1* | 3/2009 | Finkelstein et al. | 713/300 |
| 2009/0094481 A1* | 4/2009 | Vera et al. | 714/11 |
| 2009/0144572 A1* | 6/2009 | Rozen et al. | 713/322 |
| 2011/0138395 A1* | 6/2011 | Wolfe | 718/105 |
| 2011/0161627 A1* | 6/2011 | Song et al. | 712/30 |
| 2011/0191776 A1* | 8/2011 | Bose et al. | 718/102 |
| 2011/0265090 A1* | 10/2011 | Moyer et al. | 718/103 |
| 2012/0166840 A1* | 6/2012 | Rothman | G06F 9/4418 713/323 |
| 2012/0291040 A1* | 11/2012 | Breternitz et al. | 718/104 |
| 2012/0297036 A1* | 11/2012 | Frank | H04L 12/12 709/221 |
| 2012/0297050 A1* | 11/2012 | Frank | H04L 41/147 709/224 |
| 2012/0297174 A1* | 11/2012 | Frank | G06F 9/5011 713/1 |

* cited by examiner

SYSTEMS AND METHODS FOR DISTRIBUTING AN AGING BURDEN AMONG PROCESSOR CORES

CROSS-REFERENCE TO RELATED APPLICATIONS

This application claims the benefit of U.S. Provisional Patent Application No. 61/524,538, filed on Aug. 17, 2011, which is incorporated by reference herein in its entirety.

FIELD OF THE INVENTION

The field of the invention relates to semiconductor devices and more specifically to the aging of semiconductor devices with usage.

BACKGROUND

The performance of semiconductor devices used in electronic circuits often degrades over time due to the effects of high current, voltage, and environmental stresses over the lifetime use of the semiconductor device. This performance degradation is generally referred to as "semiconductor aging," or simply "aging." In processor cores, semiconductor aging is manifested as a reduction in processor speed over time, for a given supply voltage. In a multi-core processor, each core may age differently due the actual processing load seen by the individual cores over their respective lifetimes.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
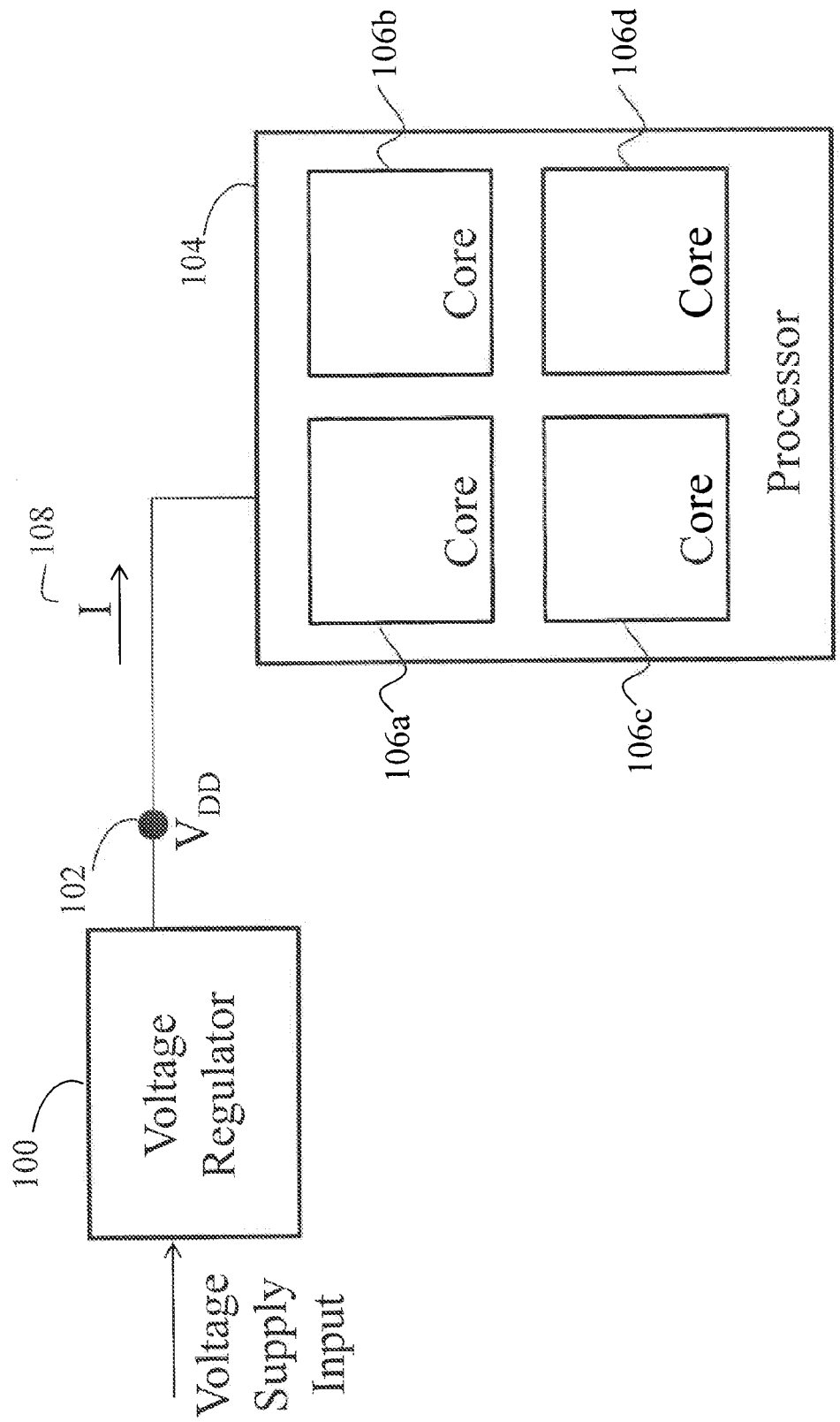
FIG. 1 shows a block diagram of a processor supplied with a regulated voltage.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Processor cores may be supplied power using a voltage regulator and a decoupling capacitor connected in parallel with the voltage output of the voltage regulator. Many high performance (e.g. high speed) processor cores require large currents for operation when supporting resource intensive applications. These large currents can reduce the voltage across the decoupling capacitor before the voltage regulator has adequate time to adjust its output voltage. The resulting drop in voltage temporarily reduces the voltage available to transistors in the processor cores. This drop in voltage can impact timing, and if the voltage drops too much, or if timing is too aggressive, the circuit can fail to operate properly. Further, processing operations requiring a high load on one core in a multi-core processor can cause disproportionate aging with respect to the other cores. Embodiments of the present disclosure provide systems and methods for reducing aging and the impact of high processing load on processor cores. By mitigating aging and the effects of increased processor load, embodiments of the present disclosure advantageously enable the processor to continue to efficiently process instructions as the processor cores age and as the processing load increases.

2. Silicon Aging and Load Balancing

Because of the impact silicon aging can have on processing capability, the age of cores in a processor can be monitored by aging monitoring circuitry to determine an optimal load balancing scheme taking into consideration the age of the cores. For example, over the lifetime of a multi-core processor, one or more cores may be used more often than other cores, causing the more frequently used cores to age faster than less frequently used cores. Embodiments of the present disclosure provide a load balancing scheme for more evenly aging cores in a processor.

It should be noted that load balancing to reduce silicon aging as described by embodiments of the present disclosure can be used to balance the effects of aging among cores of a processor across the lifetime of the silicon in the processor and not just during a current execution of code. For example, some computer operating systems balance resources by assigning different applications to different processors so that code is efficiently executed. Embodiments of the present disclosure not only balance resources for program execution but also take into consideration the aging burden on the system resources when assigning applications for execution.

2.1 Hot Carrier Injection

Aging monitoring circuitry can involve tracking different types of aging mechanisms, including (but not limited to): hot carrier injection (HCI), negative bias temperature instability (NTBI), and positive bias temperature instability (PBTI). HCI involves either an electron or a "hole" gaining sufficient kinetic energy to overcome a potential barrier necessary to break an interface state (more prevalent at hot temperatures). A permanent trap type of NBTI is caused by electric field induced Si—H bond breakdown within a silicon-oxide interface. NBTI and PBTI are also more prevalent at higher temperatures. HCI, NBTI, and PBTI can contribute to silicon aging.

HCI aging measurements involve detection of a higher than normal substrate current due to a large number of created electron-hole pairs and underlying efficient Si—H bond breakages. This leads to lower channel current and degrades the operating frequency of an integrated circuit. Moreover, the effects of HCI increase in aggressively scaled MOSFETs due to an intensified internal electric field. Higher electric fields generate higher-energy carriers ("Hot Carriers") which are more readily injected into surrounding dielectric films (gate, sidewall or buried oxides). Such injection triggers changes in the transistor device characteristics over prolonged periods that can be monitored, including: slowed frequency performance, threshold voltage variation, etc., and can ultimately lead to failure of the device or circuit that incorporates the device. For example, slowed frequency performance can be detected by monitoring reference circuits, such as ring oscillators that are strategically placed throughout the processor cores and whose frequency can be monitored, as discussed further herein.

2.2 Core Swapping to Share Aging Burden

Embodiments of the present disclosure provide systems and methods for sharing an aging burden among cores in a multi-core processor. FIG. 1 shows a block diagram of a processor supplied with a regulated voltage. In FIG. 1, voltage regulator 100 regulates an output voltage $V_{DD}$ 102 that is supplied to processor 104. Processor 104 includes a plurality of processor cores 106. Each of the processor cores 106 can age at a different rate depending on a variety of factors. For example, in an embodiment, some processor cores (e.g., cores 106a and 106b) can be active cores while other processor cores (e.g., 106c and 106d) can be inactive cores, leading to an aging discrepancy among the cores. In another embodiment, all processor cores can be active cores, but one or more processor cores (e.g., cores 106a and 106c) can be assigned a higher load to process than one or more other processor cores (e.g., cores 106b and 106d). This unequal distribution of processing load can also lead to an aging discrepancy among the processor cores. For example, more processing resources may be required to support a multimedia application (e.g. video games) as compared to the processing resources required to support a spreadsheet application. This load discrepancy can contribute to differing silicon aging among processor cores.

Figure 2:
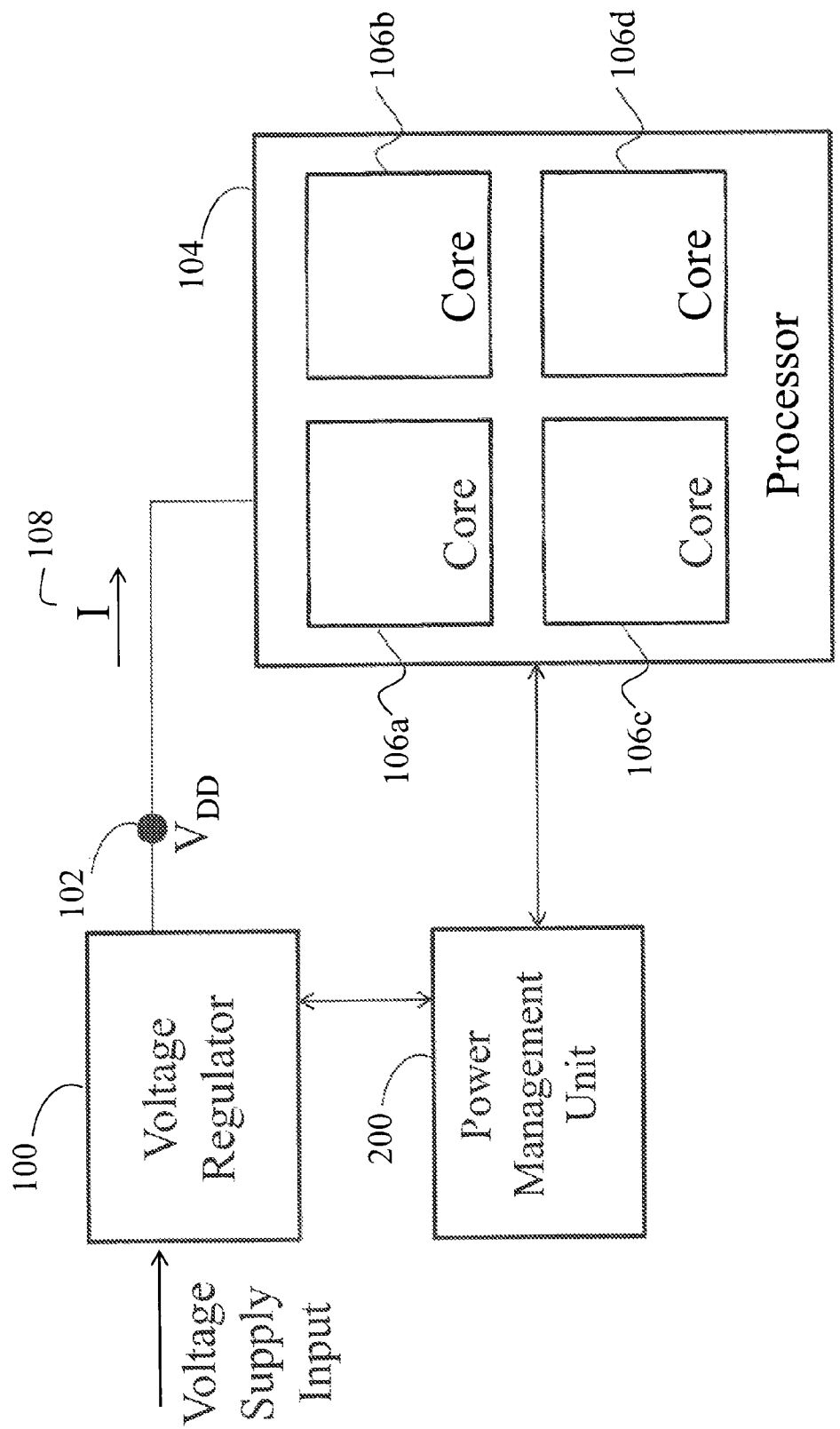
FIG. 2 shows an embodiment of the present disclosure incorporating a Power Management Unit (PMU).

FIG. 2 shows an embodiment of the present disclosure incorporating a Power Management Unit (PMU). PMU 200 is coupled to processor 104 and includes functionality for monitoring the aging of processor cores 106. For example, slowed frequency performance is a symptom of aging. Therefore reference circuits, such as ring oscillators, can be strategically placed throughout the processor cores and their frequencies monitored by the PMU 200 to detect and measure aging; where the slower the frequency of the reference circuit is verses a baseline, indicates increased aging. PMU 200 can be a hardware, software, or firmware module. PMU 200 can be implemented on the same integrated circuit (IC) as processor 104 and/or voltage regulator 100. In another embodiment, PMU 200 is implemented on a separate IC from the IC used to implemented voltage regulator 100 and processor 104.

In an embodiment, PMU 200 is configured to "swap" one or more of processor cores 106 to more evenly share the aging burden associated with processing instructions assigned to processor 104 so that processor cores 106 age at a similar rate. For example, PMU 200 monitors the aging on each of cores 106 using aging monitoring functionality in PMU 200. Using this aging monitoring functionality, PMU 200 can determine if any of the processor cores 106 are aging faster than other cores and can swap cores so that processor cores 106 age more evenly. For example, if core 106a has aged more than core 106b, PMU 200 can detect this aging difference and instruct core 106a to be "swapped out" for core 106b the next time one or more instructions are assigned to core 106a. Therefore, the aging burden on cores 106a and 106b are shared more evenly between cores 106a and 106b. In an embodiment, PMU 200 determines when the aging difference between a first core (e.g., core 106a) and a second core (e.g., core 106b) passes a predetermined threshold. Once the aging threshold is reached, PMU 200 determines that the cores should be swapped to share the aging burden more evenly.

In an embodiment, PMU 200 monitors aging on processor cores 106 and instructs processor 104 to share the aging burden approximately, or relatively, equally among cores 106 when processing an application. PMU 200 can instruct processor 104 to rotate execution of an application using each, or a subset, of cores 106 so that the aging burden is approximately evenly distributed among cores 106. For example, PMU 200 can instruct processor 104 to rotate execution of an application using each of cores 106 so that a difference in aging among cores 106 does not exceed a predetermined (e.g., user-defined or manufacturer-defined) aging threshold. This can be useful, for example, during execution of multimedia applications (e.g., video games) that require continuous, resource-intensive calculations, which can age a single processor core if the burden is not shared with other core(s). As noted, in one embodiment, it is desirable to more evenly distribute the aging burden among the plurality of processor cores. However, one skilled in the art will recognize that the cores do not have to age exactly equally in order to utilize the benefits of the invention.

In an embodiment, PMU 200 monitors instructions assigned to be processed by processor 104. Some instructions can cause a higher processing load on processor cores 106 (and thus a greater impact on aging than instructions with a lower processing load). In an embodiment, PMU 200 assigns instructions that cause a higher load to a processor core that is less impacted by aging so that the aging burden is more evenly allocated among processor cores. For example, if the aging burden disparity between processor core 106a and processor core 106*b* has passed a predetermined threshold, PMU 200 can determine that higher load instructions should be processed by the less aged processor core (e.g., core 106*b*) and that lower load instructions can continue to be processed by a core that has aged more (e.g., core 106*a*).

Figure 3:
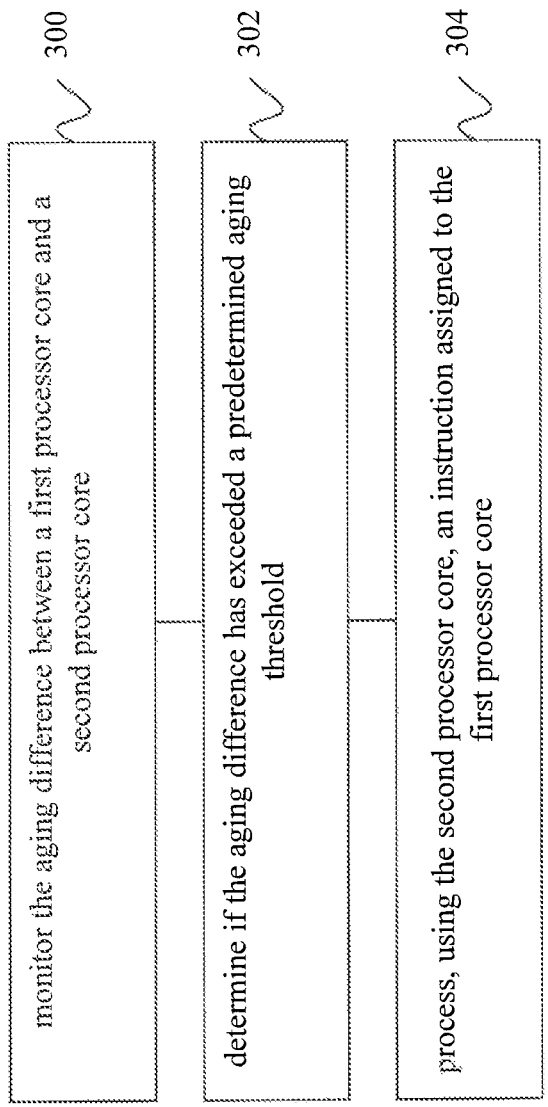
FIG. 3 is a flowchart of a method for swapping processor cores.

FIG. 3 is a flowchart of a method for swapping processor cores in accordance with an embodiment of the present disclosure. In step 300, the aging difference between a first processor core and a second processor core is monitored (e.g., by PMU 200). For example, PMU 200 can monitor the aging difference between processor cores 106*a* and 106*b*. If the aging difference has exceeded a predetermined aging threshold, as determined by step 302, an instruction assigned to the first processor core (e.g., core 106*a*) is processed using the second processor core (e.g., core 106*b*) in step 304 so that cores 106*a* and 106*b* is age more evenly. In other words, instructions are reassigned so as to more evenly share the aging.

In an embodiment, an inactive processor core can be activated and swapped-in upon failure, or near failure of an active processor core. Any of processor cores 106 can fail to adequately process instructions once the processor core has aged substantially. For example, aging can impact a processor core so much that the processing speed of the core cannot meet the timing requirements associated with one or more instructions. In an embodiment, an active processor core (e.g., core 106*c*) is run simultaneously with an inactive core (e.g., core 106*d*) to determine whether the active core has failed, or has aged relative to the inactive core. Herein, "inactive" means that the processor has not significantly aged. For example, an "inactive" core can either be a core that has not been used at all, or a core that has performed only minimal activity with corresponding minimal aging, such that the core can be used as a standard to measure the age of the active core. By measuring processing capabilities (e.g., processing speed) of the active (aged) core against an inactive (un-aged) core, PMU 200 can determine how much the active core has aged, and if the active core should be permanently retired due to the effects of aging.

PMU 200 can instruct processor 104 to swap an inactive core for a failed active core once the active core has reached the end of its usable life due to aging. For example, PMU 200 can determine that processor core 106*c* has aged so much that it is unable to adequately process instructions and can instruct processor 104 to assign future instructions to processor core 106*d* instead.

Figure 4:
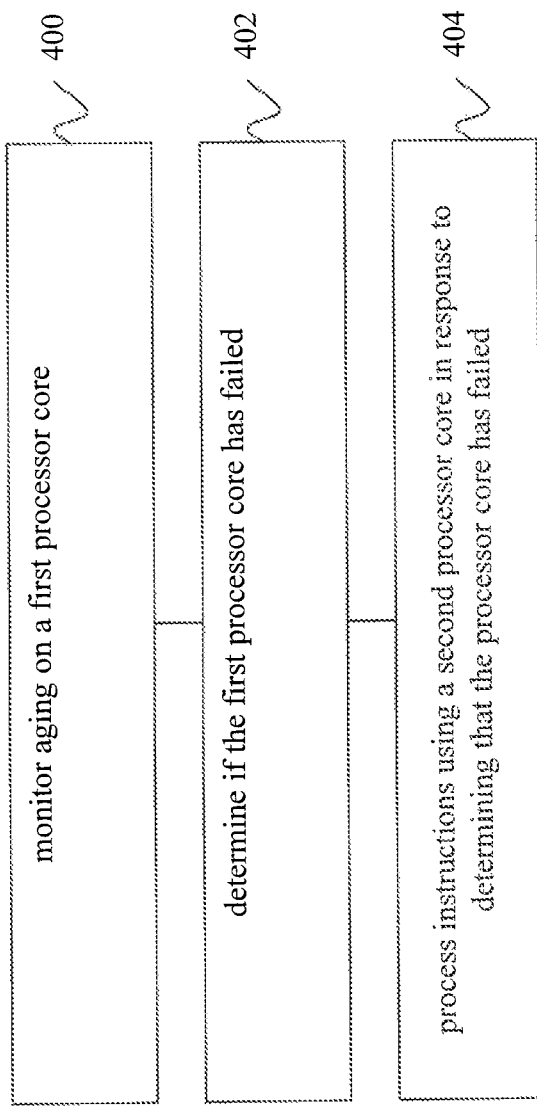
FIG. 4 is a flowchart of a method for swapping processor cores

FIG. 4 is a flowchart of a method for swapping processor cores in accordance with an embodiment of the present disclosure. In step 300, aging on a first processor core is monitored (e.g., by PMU 200). For example, PMU 200 can monitor aging on processor core 106*c*. In step 402, a determination is made regarding whether the first processor core has failed. For example, if PMU 200 determines that processor core 106*c* has aged so much that processor core 106*c* is no longer able to adequately process instructions, then PMU 200 can determine that processor core 106*c* has failed. In step 404, instructions are processed using a second processor core in response to determining that the first processor core has failed. For example, PMU 200 instructs processor 104 to assign instructions to processor 106*d* after PMU 200 has determined that processor 106*c* has failed.

3. High Load Prediction and Compensation 3.1 High Load Prediction

Referring back to FIG. 1, voltage regulator 100 receives an input supply voltage and regulates a voltage $V_{DD}$ 102 that is supplied to processor 104. Processor 104 includes a plurality of cores 106. If any of cores 106 draws a large amount of current 108 to process one or more instructions, the supplied voltage $V_{DD}$ 102 can drop as a result. In some cases, $V_{DD}$ 102 will temporarily remain at a low voltage before voltage regulator 100 can increase it back to its normal, regulated voltage.

This temporary reduction in supply voltage can slow down the operation of one or more processor cores 106. For example, if core 106*a* draws a large amount of current 108 to process an instruction set, the temporary reduction in supply voltage $V_{DD}$ 102 available to processor core 106*b* can cause processor core 106*b* to operate more slowly until $V_{DD}$ 102 is increased to its regulated level by voltage regulator 100. This decrease in operating speed can impact timing because processor cores may not be able to execute instructions at a required rate, especially if aggressive timing is implemented. Thus, if the supply voltage $V_{DD}$ 102 drops too much to support the timing scheme of processor cores 106, the circuitry in processor cores 106 can ultimately fail. The failure of a core in processor 104 is even more likely if the core has been significantly impacted by aging due the negative effects of aging on processing capability. Embodiments provide systems and methods to predict a future increase in processing load, so that actions can be taken to reduce or eliminate this loss in processing speed.

One way increased load can be predicted is by anticipating one or more instructions that will require increased processing load. In an embodiment, PMU 200 is configured to monitor processing load on processor cores 106 and predict increased load on processor cores 106. For example, if code that has been previously executed required a large amount of current 108, the address of this code can be stored in memory accessible by PMU 200. If PMU 200 determines that this code is going to be executed again, then PMU 200 can anticipate that the re-execution of this code will result in a similar processing load. Additionally, some instruction types can cause a greater load than other instruction types (e.g., because they typically require more power for execution). In an embodiment, PMU 200 can be configured to analyze instructions and predict, based on the types of the analyzed instructions, which instructions will require a high processing load. Alternatively, PMU 200 can be configured to predict a high load condition based on cache miss rates associated with processor cores 106 because, for example, PMU 200 can expect that a higher cache miss rate for any given instruction indicates that the instruction will probably cause a high processing load.

3.2 High Load Compensation

Once PMU 200 has predicted that an increased load is likely to occur, PMU 200 can take one or more actions to mitigate or eliminate negative impacts of this increased load. In an embodiment, PMU 200 instructs voltage regulator 100 to temporarily increase (i.e., pre-charge) the voltage supplied to the processor core that will soon draw a large amount of current to process one or more instructions so that the processor core does not fail.

For example, if processor core 106*a* draws a large amount of current 108, voltage regulator 100 may not be able to supply adequate voltage $V_{DD}$ 102 for processing a new, high load instruction before voltage regulator 100 can increase $V_{DD}$ 102 back to its normal, regulated voltage. If PMU 200 determines that a processor core (e.g., core 106*a*) will experience a high load requiring a higher voltage 102 than the voltage currently supplied by $V_{DD}$ 102, PMU 200 can instruct voltage regulator 100 to increase the voltage 102 before core 106*a* experiences the high processing load. In other words, PMU 200 instructs voltage regulator 100 to pre-charge core 106*a* and the other cores when a high load condition is expected on core 106*a*.

Figure 5:
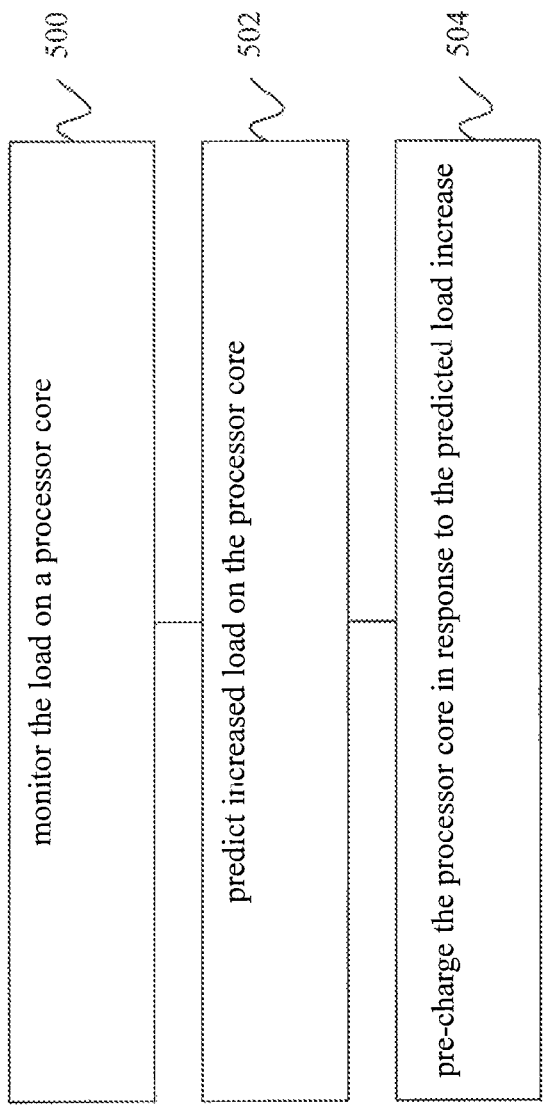
FIG. 5 is a flowchart of a method for pre-charging a processor core in response to a predicted increased load.

FIG. 5 is a flowchart of a method for pre-charging a processor core in response to a predicted increased load in accordance with an embodiment of the present disclosure. In step 500, the load on a processor core is monitored. For example, PMU 200 monitors the load on processor cores 106 of processor 104. In step 502, an increased load on a processor core is predicted. For example, PMU 200 can predict an increased load on processor core 106*a* (e.g., based on a previous execution of a high load instruction that will be processed again using core 106*a*). In step 504, the processor core is pre-charged in response to the predicted load increase. For example, PMU 200 instructs voltage regulator 100 to pre-charge processor core 106*a* in response to predicting an increased load on core 106*a*. This can be done by instructing the voltage regulator 100 to increase the output voltage 102 prior to receiving the load inducing instructions for execution.

In an embodiment, PMU 200 can monitor the overall speed of each core and can use this information when determining how to instruct voltage regulator 100 to increase the output voltage 102. For example, on-die process variations in cores 106 can cause cores 106 to operate at different speeds (e.g., core 106*a* can operate faster than core 106*b*). These faster cores may be able to operate at a faster speed than slower cores at any given voltage. For example, faster cores may be selected so that they can operate at a target speed (e.g., as set by a timing scheme) at a lower voltage, which can save power. Alternatively, in an embodiment, faster cores can be selected so that they can operate at a higher frequency at any given supply voltage 102.

In an embodiment, PMU 200 instructs a core that is going to experience a high processing load and a low supply voltage to temporarily reduce the processing frequency so that the core does not fail. For example, if a high load is expected on processor core 106*a*, and if voltage regulator 100 will not be able to supply a high enough voltage to core 106*a* to execute the instruction associated with the increased load at a first processing frequency, PMU 200 can instruct processor 104 to temporarily reduce the processing frequency of processor core 106*a* so that processor core 106*a* does not fail when the load on processor core 106*a* is increased. In an embodiment, the processing frequency is reduced by the minimum amount required to avoid failure of the core (e.g., by 5%).

While this temporary decrease in processing frequency can temporarily reduce processing performance, it can avoid failure of the processor core. Further, temporarily decreasing processing frequency can be a faster way to address a predicted high load condition when compared to pre-charging a processor core. For example, pre-charging a processor core requires a transfer of energy, which can take more time than instructing a phase lock loop (PLL) coupled to a processor core to decrease the processing frequency.

Figure 6:
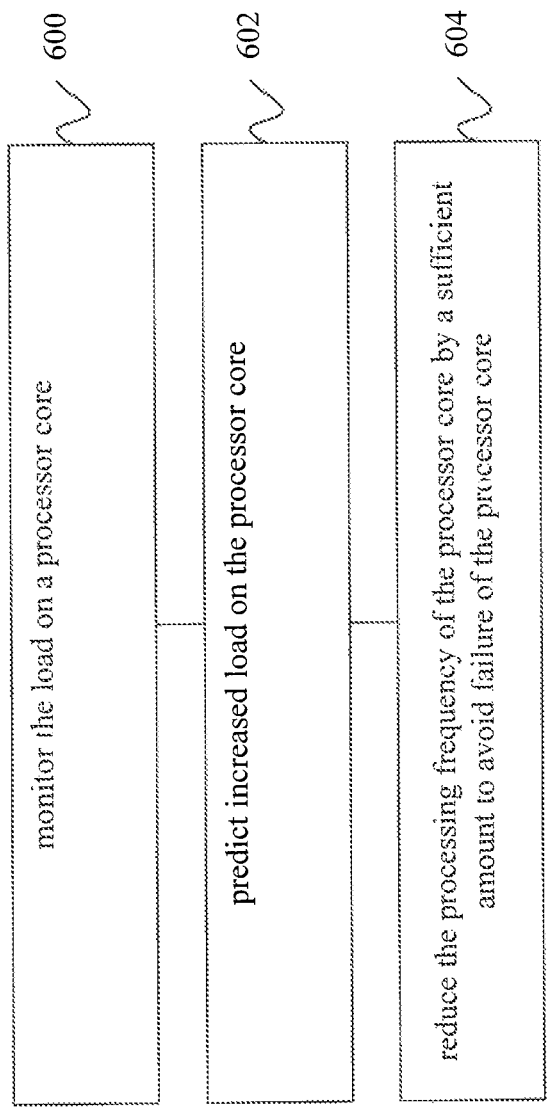
FIG. 6 is a flowchart of a method for reducing the frequency of a processor core in response to a predicted increased load.

FIG. 6 is a flowchart of a method for reducing the frequency of a processor core in response to a predicted increased load in accordance with an embodiment of the present disclosure. In step 600, the load on a processor core is monitored. For example, PMU 200 monitors the load on processor cores 106 of processor 104. In step 602, an increased load on a processor core is predicted. For example, PMU 200 can predict an increased load on processor core 106*a* (e.g., based on a previous execution of a high load instruction that will be processed again using core 106*a*). In step 604, the processing frequency of the processor core is reduced by a sufficient amount to avoid failure of the processor core. For example, PMU 200 instructs a PLL coupled to processor core 106*a* to reduce the processing frequency of core 106*a* by a sufficient amount so that a failure is avoided due to insufficient power for execution of the instruction set at a higher frequency.

4. Temperature Effects on Semiconductor Aging

As previously discussed, aging (e.g., due to HCI, NBTI, and PBTI) increases at higher temperatures. For example, as temperature increases, more kinetic energy is present in the silicon, and an electron or a "hole" can gain sufficient kinetic energy to overcome a potential barrier necessary to break an interface state, and thereby trigger the aging effects. Further, more current flow in electronic devices generally increases at higher temperatures. Thus, embodiments of the present disclosure can take temperature into consideration when determining a core swapping scheme or determining whether to take action based on a predicted increase in load for a processor core.

4.1 Thermal Management

Embodiments of the present disclosure provide systems and methods for thermal management to mitigate the impact of aging due to increased temperature on processing functionality. In an embodiment, PMU 200 can take into consideration the temperature of cores 106 when determining which core to select for processing of an instruction. For example, in the flowchart of FIG. 3, once the age of an active core has passed an aging threshold in step 302, PMU 200 can select a cooler core rather than a hotter core in step 304 because the cooler core ages slower in the presence of conditions that can contribute to aging and is thus more resistant to the causes of aging, such as HCI.

Figure 7:
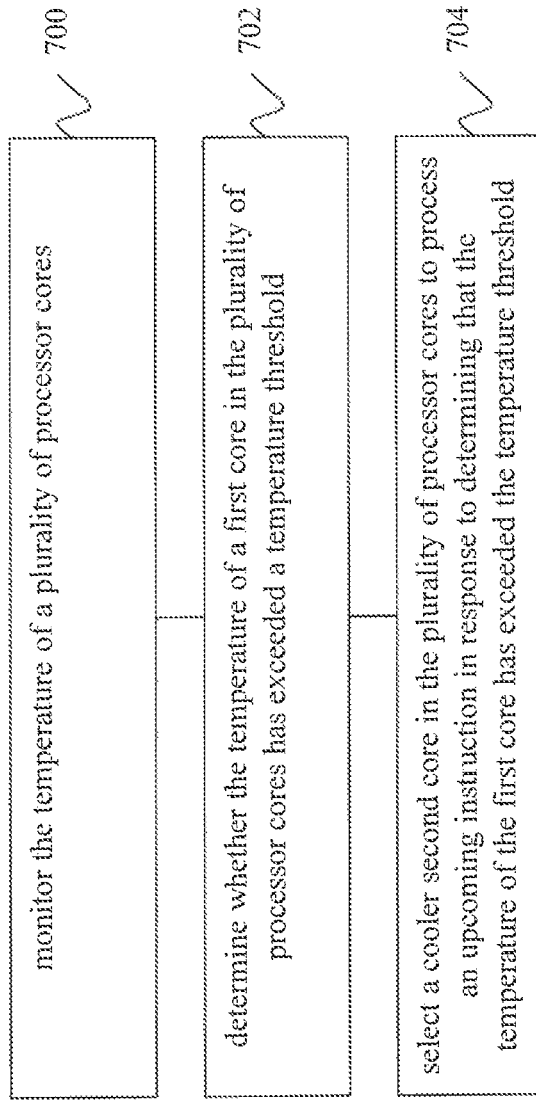
FIG. 7 is a flowchart of a method for thermal management of a plurality of processor cores.

FIG. 7 is a flowchart of a method for thermal management of a plurality of processor cores in accordance with an embodiment of the present disclosure. In step 700, the temperature of a plurality of processor cores is monitored. For example, PMU 200 monitors the temperature of cores 106. In step 702, PMU 200 determines whether the temperature of a first core (e.g., core 106*a*) in the plurality of processor cores has exceeded a temperature threshold. In step 704, a cooler second core (e.g., core 106*b*) is selected to process an upcoming instruction in response to determining that the temperature of the first core (e.g., core 106*a*) has exceeded the temperature threshold. In an embodiment, the cooler core can be chosen based on a thermal gradient. For example, in an embodiment, each core can have a thermal sensor, and PMU 200 can consider a core's distance from a hot core when determining a cooler core to select. For example, PMU 200 may want to select inactive core that is farther away from a hot core instead of selecting an inactive core that is close to a hot core.

Some multi-threaded applications execute threads on multiple cores to improve performance. For example, an application may execute a first thread on core 106*a* and a second thread on core 106*b*, simultaneously. Embodiments of the present disclosure take processor core temperature (and thus potential aging) into consideration when determining which processor cores should be used to execute a multi-threaded application. For example, PMU 200 can instruct processor 104 to process a thread of a multi-threaded application using a cooler core, or, alternatively, PMU 200 can instruct processor 104 to "unthread" the application and process both threads of the multi-threaded application on a single cooler core (e.g., if no other adequately cool cores are available).

Figure 8:
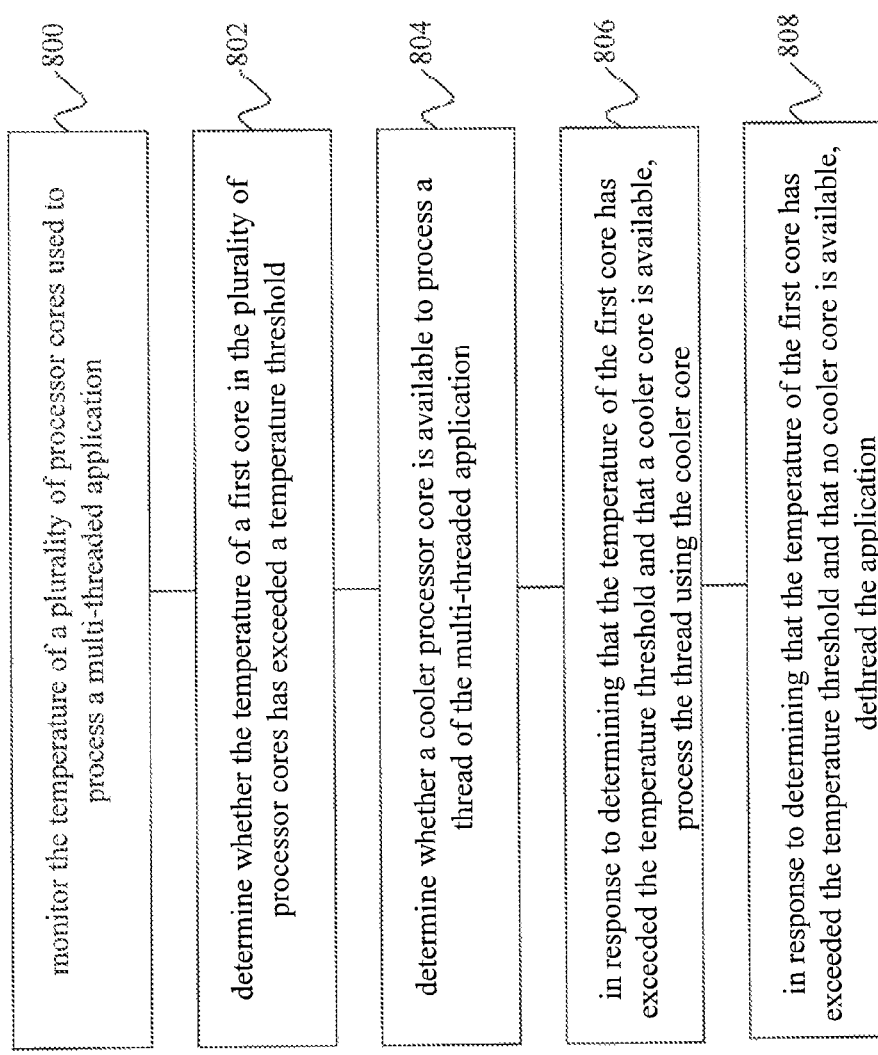
FIG. 8 is a flowchart of a method for swapping cores used for execution of a multi-threaded application based on thermal considerations.

FIG. 8 is a flowchart of a method for swapping cores used for execution of a multi-threaded application based on thermal considerations in accordance with an embodiment of the present disclosure. In step 800, the temperature of a plurality of processor cores used to process a multi-threaded application is monitored. For example, PMU 200 can monitor the temperature of processor cores 106*a* and 106*b* used to execute a dual threaded application. In step 802, PMU 200 determines whether the temperature of a first core in the plurality of processor cores has exceeded a temperature threshold. For example, PMU 200 determines whether the temperature of either processor core 106*a* or 106*b* has exceeded a temperature threshold. In step 804, PMU 200 determines whether a cooler processor core (e.g., core 106*c*) is available to process a thread of the multi-threaded application. In step 806, PMU 200 instructs processor 104 to process a thread using the cooler core if the temperature of the first core has exceeded the temperature threshold and a cooler core is available. For example, if PMU 200 determines that processor core 106*a* has exceeded the temperature threshold and that cooler processor core 106*c* is available, PMU 200 instructs processor 104 to process the thread previously executed using core 106*a* using cooler core 106*c*. In optional step 808, the application is de-threaded in response to determining that the temperature of the first core has exceeded the temperature threshold and that no cooler core is available. For example, if PMU 200 determines that core 106*a* has exceeded the temperature threshold but no cooler core is available, PMU 200 can instruct processor 104 to execute both threads using the single core 106*b*.

The systems and methods for core swapping previously described can also be modified to take the impacts of temperature into consideration when determining which core to select. For example, in the flowchart of FIG. 4, once a processor core has failed in step 402, PMU 200 can select a cooler replacement core rather than a hotter replacement core in step 404 to process future instructions.

PMU 200 can also consider the effects of temperature when determining whether to pre-charge a processor core (e.g., according to the flowchart of FIG. 5) or reduce the frequency of a processor core (e.g., according to the flowchart of FIG. 6) in response to a predicted load increase. For example, certain instructions generate more heat than other instructions (e.g., due to an increased load). One measurement of the heat to be generated by instructions is the MIPS (million instructions per second) required to process the instruction set. PMU 200 can predict the heat that will be generated by an upcoming instruction set (e.g., using stored data, MIPS, measurements taken during a previous execution of the instruction set, or by predicting a high amount of heat due to a high amount of power required for execution of the instruction set). For example, if PMU 200 determines that pre-charging a core will cause it to age faster than is desirable (e.g., once an aging threshold is reached) due to the effects of HCI, PMU 200 can be configured to select a less aged and/or cooler core to process the instruction set that is predicted to cause a high processing load. Execution of a high load instruction set on a cooler core can age a processor core less than execution of the same instruction set on a hotter core. Thus, PMU 200 can select a cooler core for pre-charging (e.g., in step 504) or for frequency reduction (e.g., in step 604) when a high load is predicted.

4.2 Processor Core States

Embodiments of the present disclosure provide systems and methods for placing processor cores of a processor in one of a plurality of states of power consumption (e.g., based on temperature and/or age of the processor core). For example, PMU 200 can determine that cores that have aged less should be used more often than cores that have aged more so that the aging burden is more evenly spread among the cores. Additionally, PMU 200 can determine that processor cores that have aged less should execute instructions that will cause a high processing load (and/or will produce high heat) and that processor cores that have aged more should either execute no instructions until aging among processor cores has been more equalized, or should execute simpler instructions that will cause a relatively small impact on aging (e.g., those instructions that will produce the least amount of heat and/or load). Simpler instructions generally require less power to execute. Thus, PMU 200 can place processor cores 106 in one of a plurality of power states (e.g., depending on the amount of power expected to be required by the processor cores).

For example, these power states can include active (e.g., full power for execution of all instructions), economy (e.g., low power for execution of simple instructions), or standby (e.g., lower power than economy for executing no instructions unless no other core is available). Another power state can be used to indicate that a processor core is pre-charging (e.g., as described above with reference to step 504 of the flowchart of FIG. 5). In an embodiment, inactive cores can be assigned no power while they are inactive (regardless of aging)—i.e., the power supply to inactive cores can be turned off.

Figure 9:
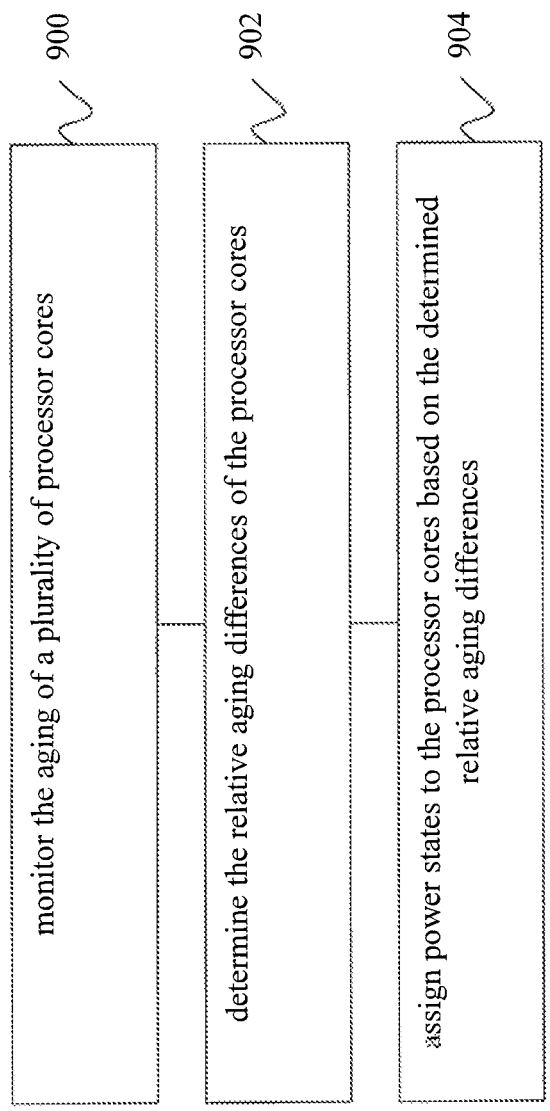
FIG. 9 is a flowchart of a method for putting cores of a processor in one of a plurality of power states responsive to aging changes.

FIG. 9 is a flowchart of a method for putting cores of a processor in one of a plurality of power states responsive to aging variation in accordance with an embodiment of the present disclosure. In step 900, the aging of a plurality of processor cores is monitored. For example, PMU 200 monitors the aging of processor cores 106. In step 902, PMU 200 determines the relative aging differences of the processor cores. For example, PMU 200 may determine that processor core 106*a* has aged the most, processor core 106*b* has aged less than processor core 106*a*, processor core 106*c* is active but has not aged at all, and that processor core 106*d* is inactive. In step 904, power states are assigned to the processor cores based on the determined relative aging differences. For example, PMU 200 can assign a standby power mode to processor core 106*a*, an economy power mode to processor core 106*b*, an active power mode to processor core 106*c*, and an inactive mode to processor core 106*d*.

In an embodiment, power states are assigned to the processor cores based on processor core temperature. For example, if one processor core is much hotter than other processor cores (e.g., when the temperature difference between the cores exceeds a predetermined threshold), it can be swapped for another core or shut down (e.g., powered off) until it cools off (e.g., when the temperature difference between the cores falls below another threshold).

In an embodiment, a processor core that is cool can be placed in an active (e.g., fall power) state, a processor core that is warmer (e.g., once a first temperature threshold has been reached) can be placed in an economy (e.g., low power) state for execution of simple instructions, and a processor that is hot (e.g., once a second temperature threshold has been reached) can be placed in a standby state for execution of no instructions unless no other core is available. These power states can be modified by PMU 200 as temperature change among the processor cores. Generally, in one embodiment, hotter processor cores will be downgraded in terms activity.

Figure 10:
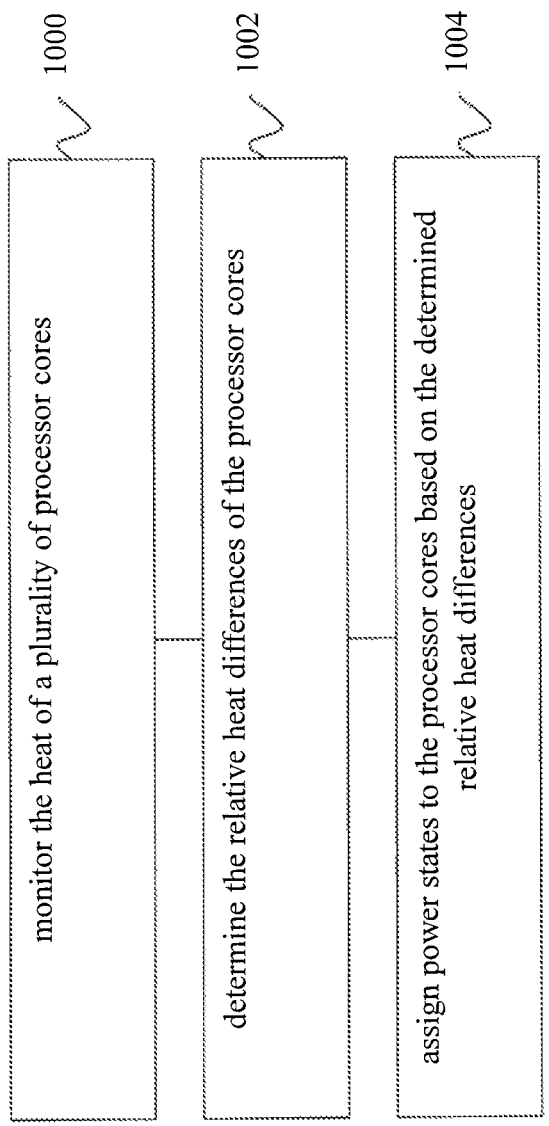
FIG. 10 is a flowchart of a method for putting cores of a processor in one of a plurality of power states responsive to temperature changes.

FIG. 10 is a flowchart of a method for putting cores of a processor in one of a plurality of power states responsive to temperature changes in accordance with an embodiment of the present disclosure. In step 1000, the temperature of a plurality of processor cores is monitored. For example, PMU 200 monitors the temperature of processor cores 106. In step 1002, PMU 200 determines the relative temperature differences of the processor cores. For example, PMU 200 may determine that processor core 106a is hot, processor core 106b is warm but not hot, processor core 106c is cool but active, and that processor core 106d is inactive. In step 1004, power states are assigned to the processor cores based on the determined relative temperature differences. For example, PMU 200 can assign a standby power mode to processor core 106a, an economy power mode to processor core 106b, an active power mode to processor core 106c, and an inactive mode to processor core 106d.

In an embodiment, PMU 200 can consider leakage rates of the processor cores when determining which cores to place in various power states. For example, some cores may be leakier than others (e.g., core 106a may be leakier than core 106b). In an embodiment, PMU 200 can be configured to select cores (e.g., for processing of an instruction) that leak at a lower rate than other cores. PMU 200 can be configured to shut off power to cores that have the highest leakage rates (e.g., PMU 200 can assign these cores an inactive power mode).

The techniques provided herein to mitigate semiconductor aging have been described in terms of processors, and multi-processor cores. However, the techniques are not limited to processors, and can be applied to any type of semiconductor device that degrades with usage, including digital and analog devices, logic circuits, amplifiers, oscillators, memories, etc.

5. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to be limiting the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above systems and methods may be implemented as a computer program executing on a machine, as a computer program product, or as a tangible and/or non-transitory computer-readable medium having stored instructions. For example, the control functions described herein for the power management unit could be embodied by computer program instructions that are executed by a computer processor, or a controller, or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the invention should not be limited by any of the above-described exemplary embodiments, but should be defined only in accordance with the following claims and their equivalents.

What is claimed is:

1. A system for distributing aging burden among a plurality of processor cores comprising:
   a processor including the plurality of processor cores comprised of semiconductor material; and
   a Power Management Unit (PMU) coupled to the processor, wherein the PMU is configured to:
      track, using a plurality of different types of aging mechanisms, aging of the respective semiconductor material of the processor cores, wherein the aging mechanisms include detection of slowed frequency performance, threshold voltage variation, and substrate current level of the respective processor cores,
      monitor, based on the tracked plurality of different types of aging mechanisms, a difference in aging of the respective semiconductor material during respective lifetimes of the plurality of processor cores,
      determine whether the difference in aging between the respective semiconductor material of a first processor core of the plurality of processor cores and a second processor core of the plurality of processor cores has exceeded a predetermined threshold, and
      reassign, in response to determining that the difference in aging has exceeded the predetermined threshold, an instruction assigned to the first processor core of the plurality of processor cores to the second processor core of the plurality of processor cores for execution if the respective semiconductor material of the first processor core of the plurality of processor cores has aged more than the respective semiconductor material of the second processor core of the plurality of processor cores.

2. The system of claim 1, wherein the PMU is further configured to:
   reassign, in response to determining that the difference in aging has exceeded the predetermined threshold, an instruction assigned to the second processor core of the plurality of processor cores to the first processor core of the plurality of processor cores for execution if the respective semiconductor material of the second processor core of the plurality of processor cores has aged more than the respective semiconductor material of the first processor core of the plurality of processor cores.

3. The system of claim 1, wherein the PMU is further configured to:
   monitor loads on the plurality of processor cores;

predict, based on the monitored loads, an increased load on the first processor core of the plurality of processor cores; and pre-charge the first processor core of the plurality of processor cores responsive to predicting the increased load.

4. The system of claim 1, wherein the PMU is further configured to:

monitor loads on the plurality of processor cores;

predict, based on the monitored loads, an increased load on the first processor core of the plurality of processor cores; and reduce a processing frequency of the first processor core of the plurality of processor cores responsive to predicting the increased load.

5. The system of claim 1, wherein the PMU is further configured to:

monitor temperature of the plurality of processor cores;

determine whether a temperature of the first processor core of the plurality of processor cores has exceeded a temperature threshold; and select a cooler processor core of the plurality of processor cores for execution of an instruction assigned to the first processor core of the plurality of processor cores responsive to determining that the temperature of the first processor core of the plurality of processor cores has exceeded the temperature threshold.

6. The system of claim 1, wherein the PMU is further configured to:

monitor temperature of the plurality of processor cores, wherein the first processor core of the plurality of processor cores is configured to process a first thread of a multi-threaded application, and wherein a second processor core of the plurality of processor cores is configured to process a second thread of the multi-threaded application;

determine whether a temperature of the first processor core of the plurality of processor cores has exceeded a temperature threshold;

determine whether a cooler processor core of the plurality of processor cores is available to process the first thread; and process the first thread using the cooler processor core of the plurality of processor cores responsive to determining that the temperature of the first processor core of the plurality of processor cores has exceeded the temperature threshold and that the cooler processor core of the plurality of processor cores is available to process the first thread.

7. The system of claim 6, wherein the PMU is further configured to:

process the first thread and the second thread using the second processor core of the plurality of processor cores responsive to determining that the temperature of the first processor core of the plurality of processor cores has exceeded the temperature threshold and that no cooler processor core of the plurality of processor cores other than the second processor core of the plurality of processor cores is available to process the first thread.

8. The system of claim 1, wherein the PMU is further configured to:

determine a relative difference in aging among the plurality of processor cores; and assign, based on the determined relative difference in aging, power states to the plurality of processor cores.

9. The system of claim 1, wherein the PMU is further configured to:

determine a relative difference in temperature among the plurality of processor cores; and assign, based on the determined relative difference in temperature, power states to the plurality of processor cores.

10. A system for distributing aging burden among a plurality of processor cores comprising:

a processor including the plurality of processor cores; and a Power Management Unit (PMU) coupled to the processor, wherein the PMU is configured to:

track aging of the plurality of processor cores based on changes in device characteristics of the respective plurality of processor cores, wherein the changes in device characteristics comprise slowed frequency performance, threshold voltage variation, and substrate current level in the respective processor cores, monitor a difference in aging among the plurality of processor cores, rotate execution of an application among the plurality of processor cores based on a predetermined aging scheme such that:

the plurality of processor cores age approximately evenly over respective lifetimes of the plurality of processor cores, the difference in aging among the plurality of processor cores does not exceed a predetermined aging threshold, and the execution of the application is transferred from a first processor core of the plurality of processor cores to a second processor core of the plurality of processor cores in response to determining that a first aging threshold corresponding to the first processor core of the plurality of processor cores has been reached and the second processor core of the plurality of processor cores has aged less than the first processor core of the plurality of processor cores.

11. The system of claim 10, wherein the PMU is further configured to execute the application on the first processor core of the plurality of processor cores and the second processor core of the plurality of processor cores in parallel to determine whether the first aging threshold of the first processor core of the plurality of processor cores has been reached.

12. The system of claim 10, wherein the PMU is further configured to:

determine a relative difference in temperature of the plurality of processor cores;

assign a first power state to the first processor core of the plurality of processor cores responsive to determining that the first processor core of the plurality of processor cores is below a first temperature threshold; and assign a second power state to the first processor core of the plurality of processor cores responsive to determining that the first processor core of the plurality of processor cores is above the first temperature threshold.

13. The system of claim 12, wherein the PMU is further configured to:

assign the second power state to the first processor core of the plurality of processor cores responsive to determining that the first processor core of the plurality of processor cores is above the first temperature threshold but below a second temperature threshold; and assign a third power state to the first processor core of the plurality of processor cores responsive to determining that the first processor core of the plurality of processor cores is above the second temperature threshold.

14. The system of claim 10, wherein the PMU is further configured to:
- monitor loads on the plurality of processor cores;
- predict, based on the monitored loads, an increased load on the first processor core of the plurality of processor cores; and
- pre-charge the first processor core of the plurality of processor cores responsive to predicting the increased load.

15. The system of claim 10, wherein the PMU is further configured to:
- monitor loads on the plurality of processor cores;
- predict, based on the monitored loads, an increased load on the first processor core of the plurality of processor cores; and
- reduce a processing frequency of the first processor core of the plurality of processor cores responsive to predicting the increased load.

16. The system of claim 10, wherein the PMU is further configured to:
- monitor temperatures of the plurality of processor cores;
- determine whether a temperature of the first processor core of the plurality of processor cores has exceeded a temperature threshold; and
- select a cooler processor core of the plurality of processor cores for execution of the application assigned to the first processor core of the plurality of processor cores responsive to determining that the temperature of the first processor core of the plurality of processor cores has exceeded the temperature threshold.

17. A system for distributing aging burden among a plurality of processor cores comprising:
- a first processor core;
- a second processor core; and
- a Power Management Unit (PMU) coupled to the first processor core and the second processor core, wherein the PMU is configured to:
  - monitor changes in device characteristics of the first processor core and the second processor core, wherein the changes in device characteristics comprise slowed frequency performance, threshold voltage variation, and substrate current level in the respective processor cores,
  - determine, based on the monitored changes in device characteristics, whether semiconductor material of the first processor core has aged faster than semiconductor material of the second processor core so that a difference in aging between the semiconductor material of the first processor core and the semiconductor material of the second processor core has exceeded a predetermined aging threshold, and
  - reassign, in response to determining that the difference in aging has exceeded the predetermined aging threshold, an instruction assigned to the first processor core to the second processor core for execution if the semiconductor material of the first processor core has aged more than the semiconductor material of the second processor core.

18. The system of claim 17, wherein the PMU is further configured to monitor bias temperature instability of the first processor core and the second processor core.

19. The system of claim 17, wherein the PMU is further configured to monitor substrate current levels of the first processor core and the second processor core, wherein the monitored substrate current levels indicate hot carrier injection (HCI) in the first processor core and the second processor core.

20. The system of claim 17, wherein the PMU is further configured to monitor channel current levels of the first processor core and the second processor core.

* * * * *